United States Patent

Hagemann

[15] 3,679,743
[45] July 25, 1972

[54] CHLORO-OXYCARBONYL ISOCYANATES

[72] Inventor: Hermann Hagemann, Cologne, Flittard, Germany

[73] Assignee: Farbenfabriken Bayer Aktiengesellschaft, Leverkusen, Germany

[22] Filed: June 16, 1970

[21] Appl. No.: 46,822

[30] Foreign Application Priority Data

June 20, 1969 Germany......................P 19 31 283.5

[52] U.S. Cl.....................260/545 R, 260/77.5 AP, 260/96 R
[51] Int. Cl........................................................C07c 119/04
[58] Field of Search.................................................260/545

[56] References Cited

OTHER PUBLICATIONS

Weisssberger, Heterocyclic Compounds with Three and Four Membered Rings, pp. 436–440 (1964).
Malinovski, Epoxides and Their Derivatives, (Translation) p. 269 (1964).

*Primary Examiner*—Lorraine A. Weinberger
*Assistant Examiner*—Robert Gerstl
*Attorney*—Sylvia Gosztonyi and Robert A. Gerlach

[57] ABSTRACT

Organic isocyanates are prepared by reacting substantially equimolar quantities of N-chlorocarbonyl isocyanate and an epoxide compound having the formula

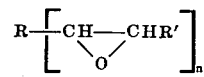

wherein
R is hydrogen or a substituted or unsubstituted, saturated or unsaturated organic radical selected from the group consisting of $C_1$ to $C_{12}$ alkyl, aralkyl, aryl, alkylene, aralkylene or arylene;
R' is hydrogen or a substituted or unsubstituted, saturated or unsaturated organic radical selected from the group consisting of $C_1$ to $C_{12}$ alkyl, aralkyl or aryl; and $n$ is 1 or 2.
at a temperature of from about −50° to about 200° C.

4 Claims, No Drawings

CHLORO-OXYCARBONYL ISOCYANATES

This invention relates to organic isocyanates and to preparation thereof. More particularly it relates to organic isocyanates prepared from N-chlorocarbonyl isocyanates and epoxides.

Numerous processes for the preparation of isocyanates are known in the art, some of which are, for example, the phosgenation of amines, the reaction of acid halides with metal cyanates, the decomposition of polyurethanes, the reaction of urethanes with oxalyl chloride and the reaction of cyanogen chloride with sulphur trioxide.

It is therefore an object of this invention to provide a new method of preparing organic isocyanates. It is another object of this invention to provide a simple, straight forward method of preparing isocyanates. It is a further object of this invention to provide isocyanates which could only be prepared with great difficulty using prior art methods. Yet another object of this invention is to provide isocyanates hitherto unknown to the art. A still further object of this invention is to provide isocyanates having valuable physical properties.

The foregoing objects and others are accomplished according to this invention, generally speaking by, reacting N-chlorocarbonyl isocyanate with an epoxide compound having the general formula

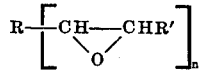

wherein
R is hydrogen or a substituted or unsubstituted, saturated or unsaturated organic radical selected from the group consisting of $C_1$ to $C_{12}$ alkyl, aralkyl, aryl, alkylene, aralkylene or arylene;
R' is hydrogen or a substituted or unsubstituted, saturated or unsaturated organic radical selected from the group consisting of $C_1$ to $C_{12}$ alkyl, aralkyl or aryl; and $n$ is 1 or 2.

The N-chlorocarbonyl isocyanate and the epoxide are reacted in approximately equimolar quantities at temperature of from about −50° to about 200°C., preferably at from about −20° to about 100°C. and particularly at from about 20° to about 60°C., if desired in the presence of an inert solvent and/or a Friedel-Crafts' catalyst, to produce an isocyanate having the general formula

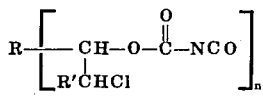

wherein R, R' and $n$ are as defined above.

Some suitable aliphatic radicals are for example, methyl, ethyl, n-propyl, isopropyl, n-butyl, isobutyl, t-butyl, n-pentyl, the corresponding straight and branched chain isomers of hexyl, heptyl, octyl, nonyl, decyl, undecyl, dodecyl and the like. Substituted radicals, such as, for example chloromethyl, chloroethyl, chlorohexyl and the like. Unsaturated aliphatic radicals, such as, for example ethylene, n-propylene, isopropylene, n-butylene, isobutylene, t-butylene, n-pentylene, hexylene, heptylene, allyl, diallyl, butadiene, chloropropylene, vinyl, divinyl and the like.

Some suitable aromatic radicals are for example phenyl, a-napthyl, b-napthyl, a-anthryl, b-anthryl, o-tolyl, m-tolyl, p-tolyl, 2,3-xylyl, 2,4-xylyl, 2,6-xylyl, o-cumenyl, mcumenyl, p-cumenyl, chlorophenyl, ethylphenyl, methyl napthyl, ethyl napthyl, benxyl, phenyl propyl, phenyl isopropyl, styryl, bisphenyl, phenylene, tolylene, napthylene, xylylene and the like.

Any mono- or bis-epoxide is contemplated for use according to the invention, some of which, are, for example, ethylene oxide, propylene oxide, 1,2-butylene oxide, 2,3-butylene oxide, 1,2-pentylene oxide, 2,3-pentylene oxide, 1,2-hexylene oxide, 1,2-octylene oxide, 1,2-dodecylene oxide, 3-ethyl-1,2-pentylene oxide, styrene oxide, alkyl substituted styrene oxides, diallyl ether mono-epoxide, diallyl ether diepoxide, 1-chloro-2,3-propylene oxide, butadiene oxide, divinyl-methane dioxide, 1,2-divinyl-ethane dioxide, 1,4-divinyl-butane dioxide, 1,8-divinyl-ocetane dioxide, 1,12-divinyl-dodecane dioxide, 1,4-divinyl-benzene dioxide, 1,5-divinyl-naphthalene dioxide, p,p'-divinyl-di-phenyl dioxide, 4,4'-divinyl-diphenyl methane dioxide, 4,4'-divinyl-diphenyl propane dioxide, 1-phenyl-2,3-propylene oxide, phenyl glycidyl ether, chlorophenyl glycidyl ether, naphthyl glycidyl ether, epichlorohydrin or diepoxides which can be obtained by reacting epichlorohydrin with bis-phenols, for example bisphenyl A-diglycidyl ether and the like.

The N-chlorocarbonyl isocyanate to be used according to the invention may be prepared by known methods, such as for example the method described in Belgian Patent No. 731 350 wherein N-chlorocarbonyl isonitrile dichloride is reacted with strong anhydrous acids.

Ethers are preferred for use as solvents according to the invention, some preferred examples of which are diethylether, tetrahydrofuran, dioxane and the like.

The catalysts may be any known Friedel-Crafts' catalyst, such as, for example aluminum trichloride, boron trifluoride, and the like.

The process according to the invention is preferably carried out by introducing the N-chloro-carbonylisocyanate into a suitable reaction vessel optionally in the presence of an inert solvent and/or a Friedel-Crafts' catalyst and cooling it in a cooling bath. An approximately equivalent molar quantity of epoxide is then added within a period of between about 10 to 120 minutes. The cooling bath is then removed and the reaction mixture is heated at a temperature between about 30° and 100°C. The product isocyanate is subsequently separated and purified by distillation. The reaction between N-chlorocarbonyl isocyanate and epoxide may however also be carried out using other proportions of the reactants such as 0.5 to 1.5 equivalents of N-chlorocarbonyl isocyanate per equivalent of epoxide.

Though the isocyanates of the invention may be utilized for numerous applications, they are particularly suited as drying or dessicating agents, and are especially useful for removing traces of moisture from synthetic resin compositions, They may also be used as cross-linking components in lacquer systems and as precursors in the preparation of polyurethane plastics.

The invention is further illustrated, but it is not intended that it be limited by the following examples, in which all parts and percentage are by weight unless otherwise indicated.

EXAMPLE 1

About 31.5 parts (0.3 mol) of N-chlorocarbonyl isocyanate and about 0.5 parts of aluminum chloride are introduced into the reaction vessel. About 13.2 parts (0.3 mol) of ethylene oxide is introduced within a period of about 90 minutes. The reaction is strongly exothermic and is carried out at about 40°C. by cooling with ice.

Distillation yields about 25 parts (56 percent of theoretical) of β-chloroethyoxycarbonyl isocyanate:

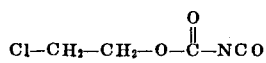

B.P.: 70°C/11 mm Hg.

EXAMPLE 2

About 31.5 parts (0.3 mol) of N-chlorocarbonyl isocyanate in about 50 parts by volume of absolute ether are introduced into a reaction vessel. About 36 parts (0.3 mol) of styrene oxide are then added with cooling at a temperature of about 15° to about 20° C. without a catalyst. After removal of the cooling bath, the temperature rises to the boiling point of ether. The reaction mixture is then stirred for about 3 hours on a water bath which is maintained at about 50° C.

About 37 parts (55 percent of theoretical) of N-(α-phenyl-β-chloroethoxycarbonyl)-isocyanate of boiling point 100°C/0.1 mm Hg.

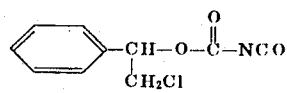

are obtained.

EXAMPLE 3

The following compounds are prepared in a manner analogous to either Example 1 or Example 2 by reacting about 31.5 parts (0.3 mol) of N-chlorocarbonyl isocyanate with:

a. About 17.4 parts (0.3 mol) of 2,3-propylene oxide to yield N-(α-methyl-β-chloroethoxycarbonyl)-isocyanate.

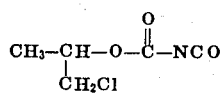

B.p. 80°C./14 mm Hg.

b. About 21.6 parts (0.3 mol) of 3,4-butylene oxide to yield N-(αethyl-β-chloroethoxycarbonyl)-isocyanate.

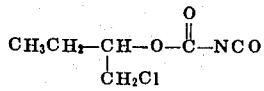

B.p. 83°C./13 mm Hg.

c. About 34.2 parts (0.3 mol) of diallylether monoepoxide to yield N-(α-methyl-allylether-β-chloroethoxycarbonyl)-isocyanate.

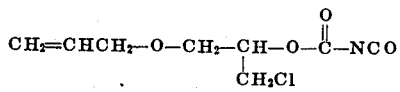

B.p. 80°–90°C./0.15 mm Hg.

d. About 23 parts (0.3 mol) of 1-chloro-2,3-propylene oxide to yield N-(α-chloromethyl-β-chloroethoxycarbonyl)-isocyanate.

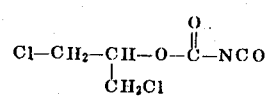

B.p. 65°C./0.3 mm Hg.

Although the invention has been illustrated in considerable detail by the foregoing examples, it is to be understood that many variations can be made by those skilled in the art without departing from the spirit and scope of the invention.

What is claimed is:

1. A process for the preparation of organic isocyanates which comprises reacting at a temperature of from about −50°C. to about 200°C. 0.5 to 1.5 equivalents of N-chlorocarbonyl isocyanate with 1 equivalent of an epoxide having the general formula

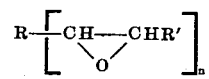

wherein R is hydrogen or a saturated or unsaturated organic radical selected from the group consisting of $C_1$ to $C_{12}$ alkyl, aryl, alkylene, aralkylene or arylene which may be substituted by chlorine or which may contain ether oxygen linkages; R' is hydrogen or a saturated or unsaturated organic radical selected from the group consisting of $C_1$ to $C_{12}$ alkyl, aralkyl or aryl which may be substituted by chlorine or which may contain ether oxygen linkages; and $n$ is 1 or 2.

2. The process of claim 1 wherein the reaction is carried out in the presence of an inert solvent.

3. The process of claim 1 wherein the reaction is carried out in the presence of a Friedel-Crafts' catalyst.

4. The process of claim 1, wherein the temperature is from about 20° to about 60°C.

* * * * *